March 20, 1962 D. MIRSKY 3,025,754
STRABISMIC FUSION MEASURE AND TRAINING APPARATUS
Filed May 8, 1957 2 Sheets-Sheet 1
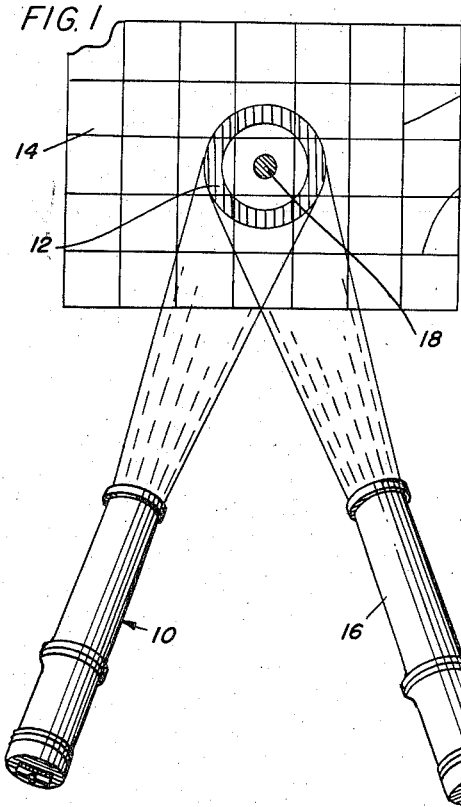
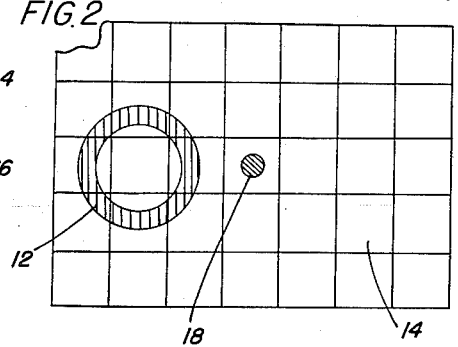
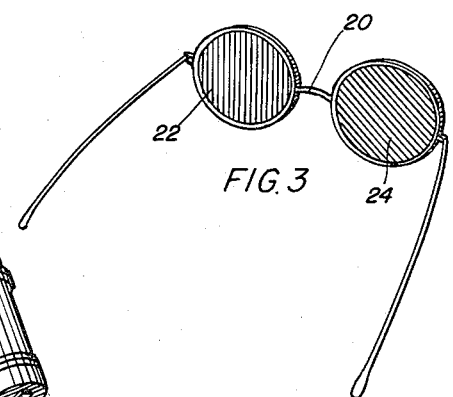
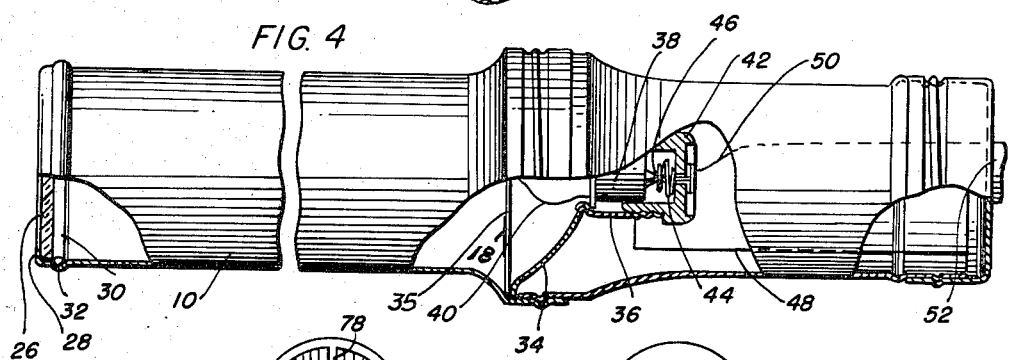
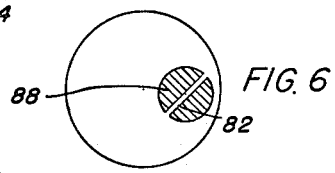
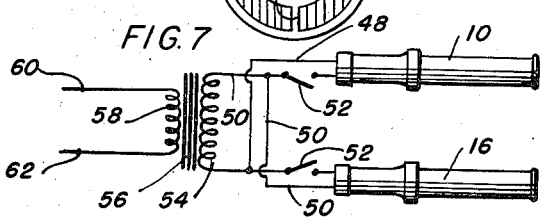
INVENTOR:
DAVID MIRSKY
ATT'Y March 20, 1962 D. MIRSKY 3,025,754
STRABISMIC FUSION MEASURE AND TRAINING APPARATUS
Filed May 8, 1957 2 Sheets-Sheet 2

INVENTOR:
DAVID MIRSKY
BY
Kent W. Worrell
ATT'Y

United States Patent Office 3,025,754
Patented Mar. 20, 1962

3,025,754
STRABISMIC FUSION MEASURE AND
TRAINING APPARATUS
David Mirsky, 5022½ W. Washington Blvd., Chicago, Ill.
Filed May 8, 1957, Ser. No. 657,912
1 Claim. (Cl. 88—20)

This invention relates in general to an apparatus for measuring, training and improving the fusion sense, and an important object of the invention is to provide apparatus which is simple in operation and economical of construction; to provide for use in the home as well as for more skilled members of the profession dealing with the eyes. Heretofore, other instruments for accomplishing similar results have been too bulky, far too expensive for individual or home use and require special training to be operated by unskilled persons.

A further object of the invention is to provide apparatus for measuring strabismic variation so that steps may be taken for correcting it.

A further object of the invention is to provide means for visually training the eyes and improving the fusion sense.

Still a further object of the invention is to provide a simple apparatus which may be operated by a patient and a person other than the patient for training and improving the vision.

Still a further object is to provide a compensated prism diopter tangent screen which takes care of the variation of the distance between the patient's eyes at the center of the screen and approaching the periphery thereof.

Other objects of the invention will appear in the specification and will be apparent from the accompanying drawings in which:

FIG. 1 represents a pair of hand light projectors and a graduated screen upon which projections of light rays from the projectors are centered;

FIG. 2 represents a screen similar to that of FIG. 1 in which the light projections are eccentric;

FIG. 3 is a perspective view of a pair of spectacles having green and red lenses;

FIG. 4 is a side elevation with parts in section of one of the light projectors as shown in FIG. 1;

FIG. 5 represents a target for use with a projector having a colored ring with opposite splits therein which may be turned with a light projector to indicate a strabismic variation other than rectangular;

FIG. 6 represents a target with a green dot split diametrically which may be turned at an angle with a projector in which it is incorporated to indicate an angle of variation from strictly rectangular coordinates;

FIG. 7 is a somewhat diagrammatic illustration of the projectors and means for electrically illuminating them;

Figure 8:
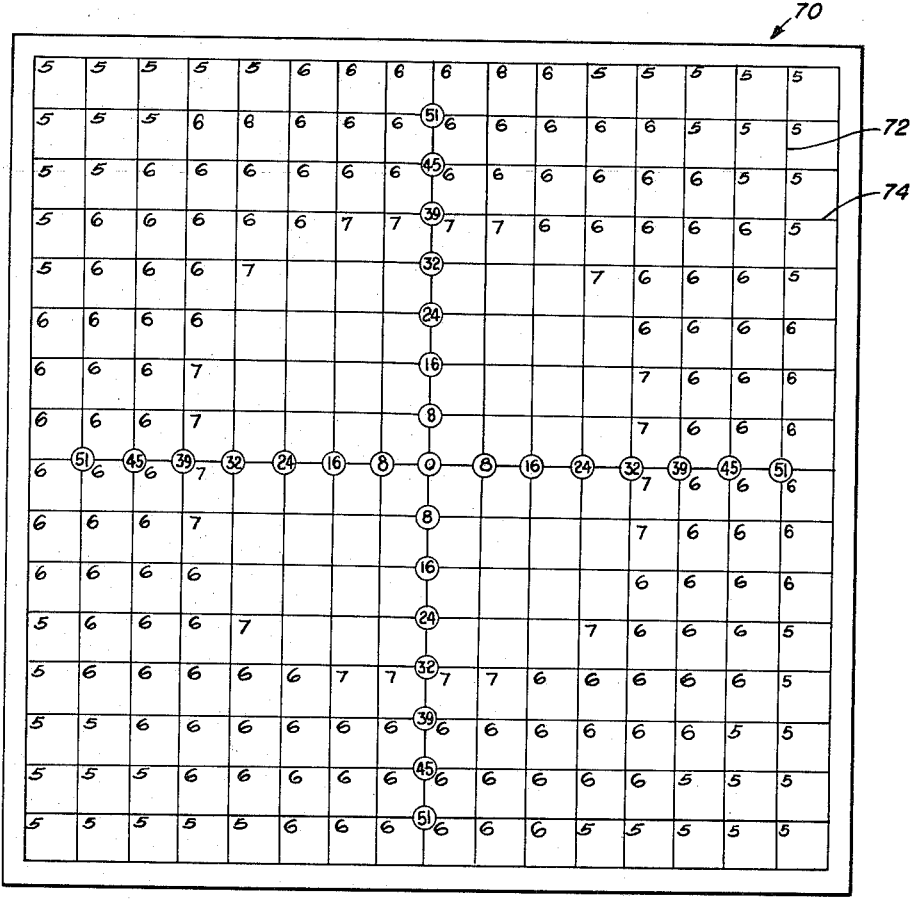
FIG. 8 represents a prism diopter tangent screen for use with the present apparatus compensated for variations of distances from the one meter spacing at the center of the screen.

It is generally recognized that there are three general types of fusion involving the retinal areas of the eyes which may be classified as follows: (a) Macular fusion involving corresponding points in and about the macula lutea; (b) perimacular fusion involving corresponding points in a circle from the macula lutea to positions approximately 10 to 15 degrees from the macula; (c) peripheral fusion involving corresponding points for the remaining area of the retina from the perimacular demarkation to the ora serrata. In persons developing a true strabismus, all of these fusional senses are absent, but it is generally possible to elicit a peripheral or perimacular binocular stimulation and response if the proper targets are presented at the angle of deviation. It should be noted that in the deviating eye, there is usually a deep rooted suppression or suspension of vision at the macular area thereby rendering binocular vision impossible at this area. In persons manifesting true strabismus, the non-deviating eye is referred to as the fixing eye or as the eye which is directed toward each point of attention.

Referring now more particular to the drawings, two hand projectors are provided, one projector 10 adapted to be held by a parent or operator for producing a red circular image 12 upon a wall screen 14 and the other projector 16 being held by a patient and adapted to project the image of a green spot 18 upon a wall or screen 14.

The green dot or spot 18 is located eccentrically (FIG. 6) to receive the maximum rays from its projector 16.

By locating the target directly in front of the bulb, in a parabolic reflector, the projected image will have a sharp bright area surrounded by a dim illumined area thus giving an unevenly illuminated image. Since a sharply defined and evenly illuminated image is ordinarily produced only by using condensing lenses, this construction provides the object circle eccentrically located so that the image is only formed by the reflections of the filament thus obtaining an evenly and brightly illuminated image without the aid of condensing lenses.

A pair of goggles or spectacles 20 is provided for a patient having a red filter 22 for one eye and a green filter 24 for the other eye. These goggles are reversible so that the filters are reversible.

In operation, the patient holds one projector, preferably the one which produces the green dot while the parent or operator holds the other projector which produces the image 12 of a red circle. The patient is requested to put the green dot inside of the red circle while wearing the red and green goggles. The use of these goggles in conjunction with the projected images forces the patient to use both eyes in order to see both targets simultaneously and permits fusion while the eyes are in the deviated position.

Each light projector as shown in FIG. 4 has an outer lens 26 held in place at the end of a projecting lip 28 and removably held therein by a spring ring 30 seated in a groove 32 at the outer end of the projector. Centrally of the projector is a reflector 34 which carries a central mounting 36 for engaging the metal end 38 of an electric lamp 40.

The images are produced by different targets or slides (as in FIGS. 5 and 6), each slide 35 being positioned immediately in front of the reflector 34 and both confined removably in place between the inner end of the hand portion of the projector 10 and the outwardly curved end of the lens portion of the projector which are threaded together.

The lamp mounting includes a receptacle 42 with a spring contact 44 for engaging an insulated end contact 46 of the lamp. Extending from the central mounting 36 and the spring contact 44 are conductors 48 and 50 which lead through a switch 52 to one winding 54 of a transformer 56, the other winding 58 of which is connected to current supply mains 60 and 62.

The projectors are located during a test so that the patient's eyes are substantially one meter from the screen, and the rays of light should be normal or nearly normal to the surface of the screen. The screen has vertical and horizontal lines 64 and 66 graduated so that each square represents a known angular strabismic deviation. If the images are substantially in a line from the projectors, deviation of one graduation would indicate a specified visual deviation between the eyes, but if one of the images, as the green dot 18 is separated from a central image of the ring 12, then the target screen does not accurately measure the angular deviation. For this purpose, a compensated prism diopter tangent screen 70 is represented in FIG. 8 having vertical and horizontal graduations 72 and 74 respectively dividing it into 8 centimeter squares and since by definition a 1 prism diopter prism will deviate a ray of light one centimeter at a distance of one meter, therefore at the center of the screen, each square is equal to a value of 8 prism diopters. It will therefore be noted that as we leave the center of the screen, and approach the periphery on a vertical or horizontal line, the value of the squares will increase in arithmetic progression up to the 32 prism diopter coordinate. After this point, it is necessary to make a compensation for the increased distance between the patient and the screen due to the angle of deviation and the squares are so valued. In the interest of accuracy for plotting the cardinal positions of gaze, each square that is not shown to be valued at 8 prism diopters is assigned its proper value plus or minus ½ of a prism diopter.

Figure 9:
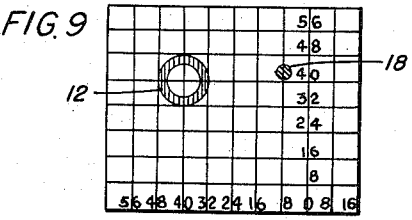
FIG. 9 represents a portion of a screen as shown in FIG. 8 which does not allow for the error induced by the increased peripheral distance between the patient and the chart.
Figure 10:
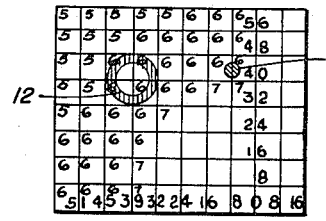
FIG. 10 represents a portion of a compensated screen as shown in FIG. 8 which more correctly shows the lateral deviation between the patient and the chart at distances around the periphery thereof.

As an example, in the chart of FIG. 9, which does not allow for the error induced by the increased distance between the patient and the chart outwardly from the center as represented by the ring 12, the lateral deviation would be interpreted as 4 full squares valued as 32 prism diopters which would be wrong. A correct interpretation of the same condition as shown in FIG. 10 in which the value of each square between the center of the circle and the center of the dot is added, it is found that the lateral deviation is only 24 prism diopters which is as nearly correct as possible.

Since most strabismic patients have an absence of macular vision in the deviating eye, the patients being tested are incapable of obtaining superimposition of the targets presented even at the angle of deviation, thereby relegating the use of presently used apparatus to those cases where the strabismus is intermittent in nature. The hand projectors of this application present two targets, one (the dot 18) of which is macular, and the other (ring 12) is peripheral.

The peripheral target is presented to the patient in such a manner that it is viewed with the deviating eye which is incapable of use of the macula. The non-deviating eye is represented as the macular target (18), thereby enabling a fusion of the patient's vision at the deviated position. Since the images of the projectors are produced on the screen 14 (or 70), and the patient reports that the green dot appears to him as being centered in the red circle, the actual separation of the two targets can then be measured linearly or dioptrically by the operator as on the screen 70 and the angle of deviation can then be determined.

Further, by reversing the targets presented to the eyes, a re-development of the fusion sense and a stimulation of the visual cells in the perimacular and macular areas may occur, thereby benefiting the re-development of binocular vision.

This apparatus does not employ targets of such a nature that some measure of macular vision in the deviating eye is necessary in order that a proper result may be obtained but illuminates its targets by images from reflected beams, the size of the targets being controlled by the size and nature of the reflector used, and does not require condenser lenses of diffusing glass.

For angular deviation which is not exactly in accordance with the rectangular coordinates of a screen, a ring image 76 as shown in FIG. 5 may have opposite diametric slits 78 and a dot image 80 as shown in FIG. 6 may have a transverse diametric slit 82, both of which may be turned by rotating the projectors 10 and 16 in which the lenses producing these images are contained. With these images for angular deviations, other than in rectangular coordinates, separate calculations may be made or the screen (14 or 70) itself may be inclined to the inclination indicated by the slits 78 or 82, thus accurately determining the strabismic deviation in the proper angle.

With this construction, a target or image which is large enough to be considered peripheral in its nature is produced in which the angle of deviation is easily determined and measured.

While a preferred construction has been described in some detail, it should be regarded as an illustration or example rather than as a limitation or restriction of the invention, since various changes in the construction, combination and arrangements of the parts may be made without departing from the spirit and scope of the invention.

I claim:

In a strabismic fusion measure and training apparatus; a flat rectangular screen disposed at a distance of one meter from a patient's eyes, said screen being provided with uniformly spaced vertical and horizontal lines defining squares of equal size, the vertical and horizontal center lines being marked with calibration values of eight prism diopters in the central portion of the screen and with calibration values progressively decreasing from the eight prism diopter value toward the edges of the screen to compensate for the increased angular distance from the patient's eyes to the peripheral areas of the screen; a pair of spectacles worn by the patient and having red and green filter lenses; and a pair of target image projectors, one projector held by the patient and the other held by an operator, each projector comprising an electric hand light with a central lamp, a surrounding parabolic reflector, a target slide mounted directly in front of the reflector, and a projection lens mounted forwardly of the target slide, the target slides carrying a red colored ring image and a green colored dot image respectively, the ring and dot image areas being disposed in laterally offset relationship to the central axis of the lamp and parabolic reflector to provide parallel light illumination of the image areas for projection on the screen.

References Cited in the file of this patent

UNITED STATES PATENTS

| | | |
|---|---|---|
| 1,091,701 | Pixley | Mar. 31, 1914 |
| 1,245,836 | Waggoner | Nov. 6, 1917 |
| 1,533,573 | Spiller | Apr. 14, 1925 |
| 1,601,394 | Hunsicker | Sept. 28, 1926 |
| 1,780,291 | Cameron | Nov. 14, 1930 |
| 1,899,135 | Cameron | Feb. 28, 1933 |
| 1,953,738 | Allen et al. | Apr. 3, 1934 |
| 2,238,207 | Ames et al. | Apr. 15, 1941 |
| 2,357,542 | Pfeil | Sept. 5, 1944 |
| 2,618,259 | Alexander | Nov. 18, 1952 |

FOREIGN PATENTS

| | | |
|---|---|---|
| 501,982 | Germany | July 8, 1930 |

OTHER REFERENCES

McBride: "Red-Green Test in Diagnosis of Eye Muscle Anomalies," article in "American Journal of Ophthalmology," vol. 34, No. 7, July 1951, pp. 1033–1035.